US012681190B2

(12) United States Patent
Shimon et al.

(10) Patent No.: US 12,681,190 B2
(45) Date of Patent: Jul. 14, 2026

(54) GNSS SPOOFER DETECTION SYSTEM AND METHOD AND COMPUTER PROGRAM PRODUCT, CONFIGURED TO ALERT FOR SPOOFERS

(71) Applicant: ISRAEL AEROSPACE INDUSTRIES LTD., Lod (IL)

(72) Inventors: Yitzhak Shimon, Tel Aviv (IL); Yacov Indik, Petah Tikva (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 135 days.

(21) Appl. No.: 18/726,047

(22) PCT Filed: Dec. 27, 2022

(86) PCT No.: PCT/IL2022/051393
§ 371 (c)(1),
(2) Date: Jul. 1, 2024

(87) PCT Pub. No.: WO2023/126925
PCT Pub. Date: Jul. 6, 2023

(65) Prior Publication Data
US 2025/0060487 A1 Feb. 20, 2025

(30) Foreign Application Priority Data
Dec. 30, 2021 (IL) ........................................ 290028

(51) Int. Cl.
G01S 19/21 (2010.01)
G01S 19/49 (2010.01)
(52) U.S. Cl.
CPC ............ *G01S 19/215* (2013.01); *G01S 19/49* (2013.01)

(58) Field of Classification Search
None
See application file for complete search history.

(56) References Cited

U.S. PATENT DOCUMENTS

| | | | |
|---|---|---|---|
| 8,922,427 B2 | 12/2014 | Dehnie et al. | |
| 9,332,434 B1 * | 5/2016 | Dotan | H04W 12/06 |
| 10,094,930 B2 | 10/2018 | Schipper et al. | |
| 10,509,130 B2 * | 12/2019 | Snyder | G01S 19/21 |

(Continued)

FOREIGN PATENT DOCUMENTS

CN 113447972 A 9/2021

OTHER PUBLICATIONS

Lee et al., "Analysis of raw GNSS measurements derived navigation solutions from mobile devices with inertial sensors", Proceedings of the 32nd International Technical Meeting of the Satellite Division of The Institute of Navigation (ION GNSS+ 2019) Sep. 20, 2019 (pp. 3812-3831).

(Continued)

*Primary Examiner* — Daniel L Greene
(74) *Attorney, Agent, or Firm* — Vorys, Sater, Seymour and Pease, LLP; Maryellen Feehery Hank

(57) ABSTRACT

A system for identifying spoofers affecting a platform, including a hardware processor configured for, at least once, providing a time-specific spoof indication including using at least plural GNSS drift indications to compute plural drift-indication specific possible spoof alerts respectively, and/or combining the drift-indication specific possible spoof alerts to yield the time-specific spoof indication.

31 Claims, 4 Drawing Sheets

(56)                  References Cited

U.S. PATENT DOCUMENTS

| | | | |
|---|---|---|---|
| 2013/0251150 A1* | 9/2013 | Chassagne | H04L 63/123 |
| | | | 380/270 |
| 2014/0002302 A1 | 1/2014 | Robinson | |
| 2015/0226858 A1 | 8/2015 | Leibner et al. | |
| 2017/0041822 A1* | 2/2017 | Thommana | H04W 72/0453 |
| 2019/0129041 A1 | 5/2019 | Lyusin | |
| 2021/0088672 A1 | 3/2021 | Balog et al. | |
| 2021/0286086 A1 | 9/2021 | Savoy, Jr. et al. | |
| 2024/0219577 A1* | 7/2024 | Averin | G01S 19/43 |

OTHER PUBLICATIONS

Junzhi et al., "Research Progress of GNSS Spoofing and Spooling Detection Technology", 019 IEEE 19th International Conference on Communication Technology (ICCT) Oct. 16, 2019 (pp. 1360-1369). IEEE. <https://ieeexplore.ieee.org/abstract/document/8947107>.

Albrektsen et al., "Robust and secure UAV navigation using GNSS, phased-array radio system and inertial sensor fusion", 2018 IEEE Conference on Control Technology and Applications (CCTA) Aug. 21, 2018 (pp. 1338-1345). IEEE. <https://folk.ntnu.no/torarnj/ccta_gnss_spoofing.pdf>.

Gu et al., "GNSS Spoofing Detection Based on Coupled Visual/Inertial/GNSS Navigation System", Sensors. Oct. 12, 2021;21(20):6769, 22 pages. <https://www.mdpi. com/1424-8220/21/20/6769> Oct. 12, 2021 (Oct. 12, 2021).

Cheong et al., "Detecting and Geolocating Jammers and Spoofers", https://insidegnss.com/detecting-and-geolocating-jammers-and-spoofers/ Sep. 30, 2019, 23 pages.

Arnold, "GNSS Spoofing and how to mitigate it", https://blog.meinbergglobal.com/2020/04/14/gnss-spoofing-and-how-to-mitigateit/ Apr. 14, 2020, 5 pages.

Hein, "Status, perspectives and trends of satellite navigation", Satellite Navigation, 1:22, 2020. doi: 10.1186/s43020-020-00023-x, 12 pages.

"Other Global Navigation Satellite Systems (GNSS)", GPS.gov, 2021, https://www.gps.gov/systems/gnss/, 2 pages.

"Wide Area Augmentation System", Wikipedia, https://en.wikipedia.org/wiki/Wide_Area_Augmentation_System, 15 pages, Apr. 7, 2024.

"European Geostationary Navigation Overlay Service", Wikipedia, https://en.wikipedia.org/wiki/European_Geostationary_Navigation_Overlay_Service, 6 pages, Mar. 19, 2024.

Kinnari et al., "GNSS-denied geolocalization of UAVs by visual matching of onboard camera images with orthophotos", 2021 20th international conference on advanced robotics (ICAR). IEEE. Oct. 19, 2021.

"Networking hardware", Wikipedia, https://en.wikipedia.org/wiki/Networking_hardware, 4 pages, Feb. 24, 2024.

"Engineering", Avionics—Engineering, Safety Design for Space Systems, 2009, https://www.sciencedirect.com/topics/engineering/avionics-system, 8 pages.

Diez, "Spoofing and jamming over GNSS", INCIBE, https://www.incibe-cert.es/en/blog/spoofingand-jamming-over-gnss, Jul. 9, 2020, 6 pages.

Time Figure of Merit (TFOM), http://manuals.spectracom.com/SS/Content/NC_and_SS/Com/Topics/TIME/TFOM.htm, 1 page, Oct. 21, 2021.

Pulse-per-second signal, Wikipedia, https://en.wikipedia.org/wiki/Pulse-persecond_signal, 2 pages, Dec. 14, 2023.

MIL-STD-1553, Wikipedia, https://en.wikipedia.org/wiki/MIL-STD-1553, 11 pages, Dec. 13, 2024.

Arneja et al., "Solving the GPS Equations", http://mason.gmu.edu/~treid5/Math447/GPSEquations/, 4 pages, Oct. 1, 2023.

Lo et al., "Keynote: The Benefits of Low Cost Accelerometers for GNSS Anti-Spoofing", Proceedings of the ION Pacific PNT 2017 Conference, 2017, pp. 775-796.

Scott, "Anti-Spoofing & Authenticated Signal Architectures for Civil Navigation Systems", Proceedings of ION GPS/GNSS, 2003, pp. 1543-1552.

* cited by examiner

Fig. 3a

Operation 10: sampling all or any subset of GNSS indications values e.g., T1 and/or T2 and/or P1 and/or P3 and/or P4, periodically, e.g., once per second yielding (e.g.) a 1PPS signal. Values sampled may include general data and/or platform attitude information and/or platform position information.

Operation 20: proceed to compute possible (drift-indication specific) spoof alerts, via all or subset of operations 30 – 90, but typically if current GNSS input of the vehicle is reliable, discard current GNSS input, and return to operation 10.

Operation 30: Identify a GNSS time drift and use to compute a possible (drift-indication specific) spoof alert

Operation 40: Identify a GNSS barometric altitude drift and use to compute a possible (drift-indication specific) spoof alert

Operation 50: Identify a GNSS computed altitude drift and use to compute a possible (drift-indication specific) spoof alert

Operation 60: Identify a GNSS position drift relative to INS and use to compute a possible (drift-indication specific) spoof alert

Operation 70: Identify a GNSS position drift relative to an anchoring system and use to compute a possible (drift-indication specific) spoof alert

To Fig. 3b, operation 80

Fig. 3b

From Fig. 3a, operation 70
Operation 80: Identify a GNSS position drift relative to a Network Member Position and use to compute a possible (drift-indication specific) spoof alert
Operation 90: Identify a GNSS position drift relative to a known ground stations and use to compute a possible (drift-indication specific) spoof alert
Operation 100: Identify Spoof Position
Operation 110: combine drift-indication specific possible spoof alerts to yield time-specific spoof indication. Count accumulated (e.g. consecutive) time-specific spoof indications or possible (drift-indication specific) spoof alerts to enable alerting for presence of spoofer affecting platform, if a sequence of time-specific spoof indications accumulates which answers to a criterion of consecutiveness
Operation 120: threshold accumulated possible spoof indications to detect if a spoofer is present, and if so:
Operation 130: Compute Last Reliable Position Radius

GNSS SPOOFER DETECTION SYSTEM AND METHOD AND COMPUTER PROGRAM PRODUCT, CONFIGURED TO ALERT FOR SPOOFERS

CROSS-REFERENCE TO RELATED APPLICATIONS

This application claims the benefit of ISRAEL patent application number 290028 filed on Dec. 30, 2021, the entire disclosure of which is incorporated herein by reference.

FIELD OF THIS DISCLOSURE

The present invention relates generally to moving platforms, and more particularly to spoofers impeding motion of moving platforms.

BACKGROUND FOR THIS DISCLOSURE

Methods for finding and disabling spoofers, including an algorithm that may be added to a GNSS receiver, are described online here: insidegnss.com/detecting-and-geolocating-jammers-and-spoofers.

Mitigation of GNSS spoofing is described online here, including a hardware solution that may be added to a GNSS receiver: blog.meinbergglobal.com/2020/04/14/gnss-spoofing-and-how-to-mitigate-it/. Methods for overcoming GNSS spoofing are described online here: chronos.co.uk/files/pdfs/itsf/2017/day2/Session1_Talk2_Danger % 20 in %20GPS%20jamming %20-%20How%20to%20overcome.pdf. Conventional GNSS systems are described online here: gps.gov/systems/gnss/. GNSS or Global Navigation Satellite Systems include all satellite navigation systems which give moving objects geo-spatial positioning functionality, typically worldwide. GNSS systems include, for example, the United States' Global Positioning System (GPS), GLONASS® global navigation satellite system (Globalnaya Navigatsionnaya Sputnikovaya Sistema), Galileo® global navigation satellite system, and BeiDou® global navigation satellite system. For example, the GPS boasts about 30 Earth orbit satellites in six different orbital planes.

Other relevant technologies are described online here: en.wikipedia.org/wiki/Wide_Area_Augmentation_System arxiv.org/abs/2103.14381en.wikipedia.org/wiki/Networking_hardware and sciencedirect.com/topics/engineering/avionics-system.

The disclosures of all publications and patent documents mentioned in the specification, and of the publications and patent documents cited therein directly or indirectly, are hereby incorporated by reference, other than subject matter disclaimers or disavowals. If the incorporated material is inconsistent with the express disclosure herein, the interpretation is that the express disclosure herein describes certain embodiments, whereas the incorporated material describes other embodiments. Definition/s within the incorporated material may be regarded as one possible definition for the term/s in question.

SUMMARY OF CERTAIN EMBODIMENTS

The following terms may be construed either in accordance with any definition thereof appearing in the prior art literature or in accordance with the specification, or to include in their respective scopes, the following:

Spoofing-intended to include any "intentional interference technique, in which a device transmits a signal analogous to the satellite signal, but which has higher power, in such a way that the GNSS receiver tunes the false signal instead of the real one, and thus computes an incorrect position or an erroneous time variable", e.g., as described online here: incibe-cert.es/en/blog/spoofing-and-jamming-over-gnss GNSS-Global Navigation Satellite System, intended to include any system, e.g. satellite system, that provides positioning and/or navigation and/or timing data, typically as a service, to platforms e.g. vehicles, whether locally, regionally or globally. GPS is one example of a GNSS. Other examples are sources of positioning and/or navigation and/or timing (p or n or t) data that were not originally developed for navigation purposes such as television broadcast towers, regardless of which broadcast power or frequency band they use, eloran, inertial systems, etc. GNSS may provide PNT data, or may provide only P and N and not T, or only T, or any other sub-combination of PNT.

DTM-digital terrain model

INS-Inertial Navigation System

Tfom/TFOM—e.g., as defined online here: incibe-cert.es/en/blog/spoofing-and-jamming-over-gnss vehicle-a non-limiting example of a "platform".

Altitude-distance between platform and a reference altitude e.g. sea level

Attitude-orientation of platform relative to a reference orientation e.g. the horizon, typically including pitch (relative to reference Y-axis) and/or roll (relative to reference X-axis), and/or yaw (relative to reference Z-axis)

Use of illegal spoofer devices can seriously affect mission completion ability and/or safety of platforms such as, for example, drones or commercial air flights.

Certain embodiments allow fleets of platforms e.g., moving objects that use GNSS, such as but not limited to non-autonomous or autonomous cars and other vehicles, drones, ships, airplanes, to detect spoofers and identify their position.

Certain embodiments locate a spoofer, typically using a standard GNSS receiver to locate the spoofer.

Certain embodiments seek to provide a GNSS spoofer indication method, or method for identifying whether or not an ostensible network element (e.g., ostensible satellite) is actually a GNSS spoofer or imposter, typically including using a standard GNSS receiver to locate the spoofer.

Certain embodiments seek to provide a comparison of a GNSS solution with other standard systems in real time, thereby to find errors.

Certain embodiments seek to provide filtering of information to handle only real events, and to discard any deviation between the GNSS solution and other systems.

Certain embodiments seek to provide a system which gives an operator e.g. pilot, of a platform P* and/or other platforms networked to platform P* and/or to operators thereof, an alert, in real time, of detected spoofing.

Certain embodiments seek to provide apparatus for coping with spoofers.

Certain embodiments of the present invention seek to provide circuitry typically comprising at least one processor in communication with at least one memory, with instructions stored in such memory executed by the processor to provide functionalities which are described herein in detail. Any functionality described herein may be firmware-implemented or processor-implemented, as appropriate.

It is appreciated that any reference herein to, or recitation of, an operation being performed is, e.g. if the operation is performed at least partly in software, is intended to include both an embodiment where the operation is performed in its entirety by a server A, and also to include any type of "outsourcing" or "cloud" embodiments in which the operation, or portions thereof, is or are performed by a remote processor P (or several such), which may be deployed off-shore or "on a cloud", and an output of the operation is then communicated to, e.g. over a suitable computer network, and used by, server A. Analogously, the remote processor P may not, itself, perform all of the operations, and, instead, the remote processor P itself may receive output/s of portion/s of the operation from yet another processor/s P', may be deployed off-shore relative to P, or "on a cloud", and so forth.

There is thus provided, in accordance with at least one embodiment of the present invention, The present invention typically includes at least the following embodiments:

Embodiment 1. A system for identifying spoofers affecting a platform e.g., vehicle, including:

a hardware processor configured for, at least once, providing a time-specific spoof indication including using at least GNSS drift indication/s to compute drift-indication specific possible spoof alert/s respectively, and/or combining drift-indication specific possible spoof alerts to yield the time-specific spoof indication.

Embodiment 2. The system according to any of the preceding embodiments and also comprising alerting for presence of a spoofer affecting the platform, if at least one sequence of time-specific spoof indications (or of drift-indication specific possible spoof alerts) occurs which answers to a criterion of consecutiveness (such as but not limited to a run of 10 consecutive time-specific spoof indications occurring in 10 respective consecutive time-units).

Embodiment 3. The system according to any preceding embodiment wherein the computing of a time-specific spoof indication occurs repeatedly.

Embodiment 4. The system according to any preceding embodiment wherein each drift-indication specific possible spoof alert is computed each time a periodically occurring signal (e.g. a 1pps signal which is generated by the GNSS) is raised and/or wherein each GNSS drift indication used to compute each drift-indication specific possible spoof alert, is time-tagged, thereby to ensure synchronization of all drift indications used and/or all drift-indication specific possible spoof alerts computed (e.g. by a processor in data communication with the platform avionics computer).

According to certain embodiments, the 1PPS is generated by the GNSS and in all other operations 1 second (say) is counted according to an internal clock.

Embodiment 5. The system according to any preceding embodiment and wherein the time-specific spoof indication includes reporting time-specific spoof indication via an aerial network to other platforms, and/or reporting the time-specific spoof indication to an operator e.g. a pilot of a platform performing the method.

Embodiment 6. The system according to any of the preceding embodiments wherein the reporting includes providing, to other platforms and/or to the operator of the platform performing the method, a last reliable position of the platform.

Embodiment 7. The system according to any preceding embodiment wherein the plural GNSS drift indications include a GNSS time drift.

Embodiment 8. The system according to any preceding embodiment wherein the plural GNSS drift indications include a GNSS barometric altitude drift.

Embodiment 9. The system according to any preceding embodiment wherein the plural GNSS drift indications include a GNSS computed altitude drift.

Embodiment 10. The system according to any preceding embodiment wherein the plural GNSS drift indications include a GNSS position drift.

Embodiment 11. The system according to any of the preceding embodiments wherein the GNSS position drift is determined relative to an inertial navigation subsystem aka INS (which may be GNSS aided).

Embodiment 12. The system according to any of the preceding embodiments wherein the GNSS position drift is determined relative to an anchoring system.

Embodiment 13. The system according to any of the preceding embodiments wherein the GNSS position drift is determined relative to a network member position.

Embodiment 14. The system according to any of the preceding embodiments wherein the GNSS position drift is determined relative to at least one ground station whose position is known.

Embodiment 15. The system according to any preceding embodiment and wherein the time-specific spoof indication is used to navigate the platform.

Embodiment 16. The system according to any preceding embodiment and also comprising a platform having navigation apparatus and wherein the time-specific spoof indication is used by the navigation apparatus to navigate the platform.

Embodiment 17. The system according to any of the preceding embodiments wherein the GNSS position drift comprises GNSS Latitude drift.

Embodiment 18. The system according to any of the preceding embodiments wherein the GNSS position drift comprises GNSS Longitude drift.

Embodiment 19. The system according to any preceding embodiment where at least one unreliable input is filtered out.

Embodiment 20. The system according to any of the preceding embodiments wherein the GNSS position drift is determined relative to a network member spoofing indication.

Embodiment 21. The system according to any preceding embodiment wherein the time-specific spoof indication triggers an alert, to a platform operator, of presence of a spoofer affecting the platform.

Embodiment 22. The system according to any preceding embodiment wherein the time-specific spoof indication triggers an alert, sent to network members, of presence of a spoofed affecting the platform.

Embodiment 23. The system according to any of the preceding embodiments wherein the alert comprises a report of the platform's last known reliable position e.g. the last position of the platform which is known to be unaffected by the spoofer.

Embodiment 24. The system according to any of the preceding embodiments wherein the alert comprises a report of the platform's last reliable position radius.

Embodiment 25. A method for identifying spoofers affecting a platform e.g., vehicle, the method including:

providing a time-specific spoof indication including using at least plural GNSS drift indications to compute plural drift-indication specific possible spoof alerts respectively, and combining the drift-indication specific possible spoof alerts to yield the time-specific spoof indication.

Embodiment 26. A computer program product, comprising a non-transitory tangible computer readable medium having computer readable program code embodied therein, the computer readable program code adapted to be executed to implement a method for identifying spoofers affecting a platform e.g., vehicle, the method including providing a time-specific spoof indication by using at least plural GNSS drift indications to compute plural drift-indication specific possible spoof alerts respectively, and combining the drift-indication specific possible spoof alerts to yield the time-specific spoof indication.

Also provided, excluding signals, is a computer program comprising computer program code means for performing any of the methods shown and described herein when the program is run on at least one computer; and a computer program product, comprising a typically non-transitory computer-usable or -readable medium e.g. non-transitory computer-usable or -readable storage medium, typically tangible, having a computer readable program code embodied therein, the computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g., on a computer screen or other computer output device, store, and accept information such as information used by or generated by any of the methods and apparatus shown and described herein; the above processor/s, display and input means including computer programs, in accordance with all or any subset of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as flash drives, optical disks, CDROMs, DVDs, BluRays, magnetic-optical discs or other discs; RAMs, ROMs, EPROMS, EEPROMs, magnetic or optical or other cards, for storing, and keyboard or mouse for accepting. Modules illustrated and described herein may include any one or combination or plurality of: a server, a data processor, a memory/computer storage, a communication interface (wireless (e.g., BLE) or wired (e.g., USB)), or a computer program stored in memory/computer storage.

The term "process" as used above is intended to include any type of computation or manipulation or transformation of data represented as physical, e.g., electronic, phenomena which may occur or reside e.g. within registers and/or memories of at least one computer or processor. Use of nouns in singular form is not intended to be limiting; thus, the term processor is intended to include a plurality of processing units which may be distributed or remote, the term server is intended to include plural typically interconnected modules running on plural respective servers, and so forth.

The above devices may communicate via any conventional wired or wireless digital communication means, e.g., via a wired or cellular telephone network or a computer network such as the Internet.

The apparatus of the present invention may include, according to certain embodiments of the invention, machine readable memory containing or otherwise storing a program of instructions which, when executed by the machine, implements all or any subset of the apparatus, methods, features and functionalities of the invention shown and described herein. Alternatively, or in addition, the apparatus of the present invention may include, according to certain embodiments of the invention, a program as above which may be written in any conventional programming language, and optionally a machine for executing the program, such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless stated otherwise, terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining", "providing", "accessing", "setting" or the like, refer to the action and/or processes of at least one computer/s or computing system/s, or processor/s or similar electronic computing device/s or circuitry, that manipulate and/or transform data which may be represented as physical, such as electronic, quantities e.g. within the computing system's registers and/or memories, and/or may be provided on-the-fly, into other data which may be similarly represented as physical quantities within the computing system's memories, registers or other such information storage, transmission or display devices or may be provided to external factors e.g. via a suitable data network. The term "computer" should be broadly construed to cover any kind of electronic device with data processing capabilities, including, by way of non-limiting example, personal computers, servers, embedded cores, computing systems, communication devices, processors (e.g. digital signal processor (DSP), microcontrollers, field programmable gate arrays (FPGAs), application specific integrated circuits (ASICs), etc.), and other electronic computing devices. Any reference to a computer, controller or processor is intended to include one or more hardware devices e.g., chips, which may be co-located or remote from one another. Any controller or processor may, for example, comprise at least one CPU, DSP, FPGA or ASIC, suitably configured in accordance with the logic and functionalities described herein.

Any feature or logic or functionality described herein may be implemented by processor/s or controller/s configured as per the described feature or logic or functionality, even if the processor/s or controller/s are not specifically illustrated for simplicity. The controller or processor may be implemented in hardware, e.g., using one or more Application-Specific Integrated Circuits (ASICs) or Field-Programmable Gate Arrays (FPGAs), or may comprise a microprocessor that runs suitable software, or a combination of hardware and software elements.

The present invention may be described, merely for clarity, in terms of terminology specific to, or references to, particular programming languages, operating systems, browsers, system versions, individual products, protocols, and the like. It will be appreciated that this terminology or such reference/s is intended to convey general principles of operation clearly and briefly, by way of example, and is not intended to limit the scope of the invention solely to a particular programming language, operating system, browser, system version, or individual product or protocol. Nonetheless, the disclosure of the standard or other professional literature defining the programming language, operating system, browser, system version, or individual product or protocol in question, is incorporated by reference herein in its entirety.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g., a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate or route, or otherwise manipulate or process information as described herein and/or to perform functionalities described herein and/or to implement any engine, interface or other system illustrated or described herein. Any suitable computerized data storage e.g., computer memory, may be used to store information received by or generated by the systems shown and described herein. Functionalities shown and described herein may be divided between a server computer and a plurality of client computers. These or any other computerized components shown and described herein may communicate between themselves via a suitable computer network.

The system shown and described herein may include user interface/s e.g. as described herein, which may, for example, include all or any subset of: an interactive voice response interface, automated response tool, speech-to-text transcription system, automated digital or electronic interface having interactive visual components, web portal, visual interface loaded as web page/s or screen/s from server/s via communication network/s to a web browser or other application downloaded onto a user's device, automated speech-to-text conversion tool, including a front-end interface portion thereof and back-end logic interacting therewith. Thus the term user interface, or "UI" as used herein, includes also the underlying logic which controls the data presented to the user e.g. by the system display, and receives and processes and/or provides to other modules herein, data entered by a user e.g. using her or his workstation/device.

BRIEF DESCRIPTION OF THE DRAWINGS

Certain embodiments of the present invention are illustrated in the following drawings; in the block diagrams, arrows between modules may be implemented as APIs and any suitable technology may be used for interconnecting functional components or modules illustrated herein in a suitable sequence or order e.g., via a suitable API/Interface. For example, state-of-the-art tools may be employed, such as but not limited to Apache Thrift™ remote procedure call (RPC) framework and Apache Avro™ data serialization framework, which provide remote call support. Or, a standard communication protocol may be employed, such as but not limited to HTTP (Hypertext Transfer Protocol) or MQTT (Message Queuing Telemetry Transport), and may be combined with a standard data format, such as but not limited to JSON (JavaScript Object Notation) or XML (Extensible Markup Language). According to one embodiment, one of the modules may share a secure API with another. Communication between modules may comply with any customized protocol or customized query language, or may comply with any conventional query language or protocol.

Figure 1:
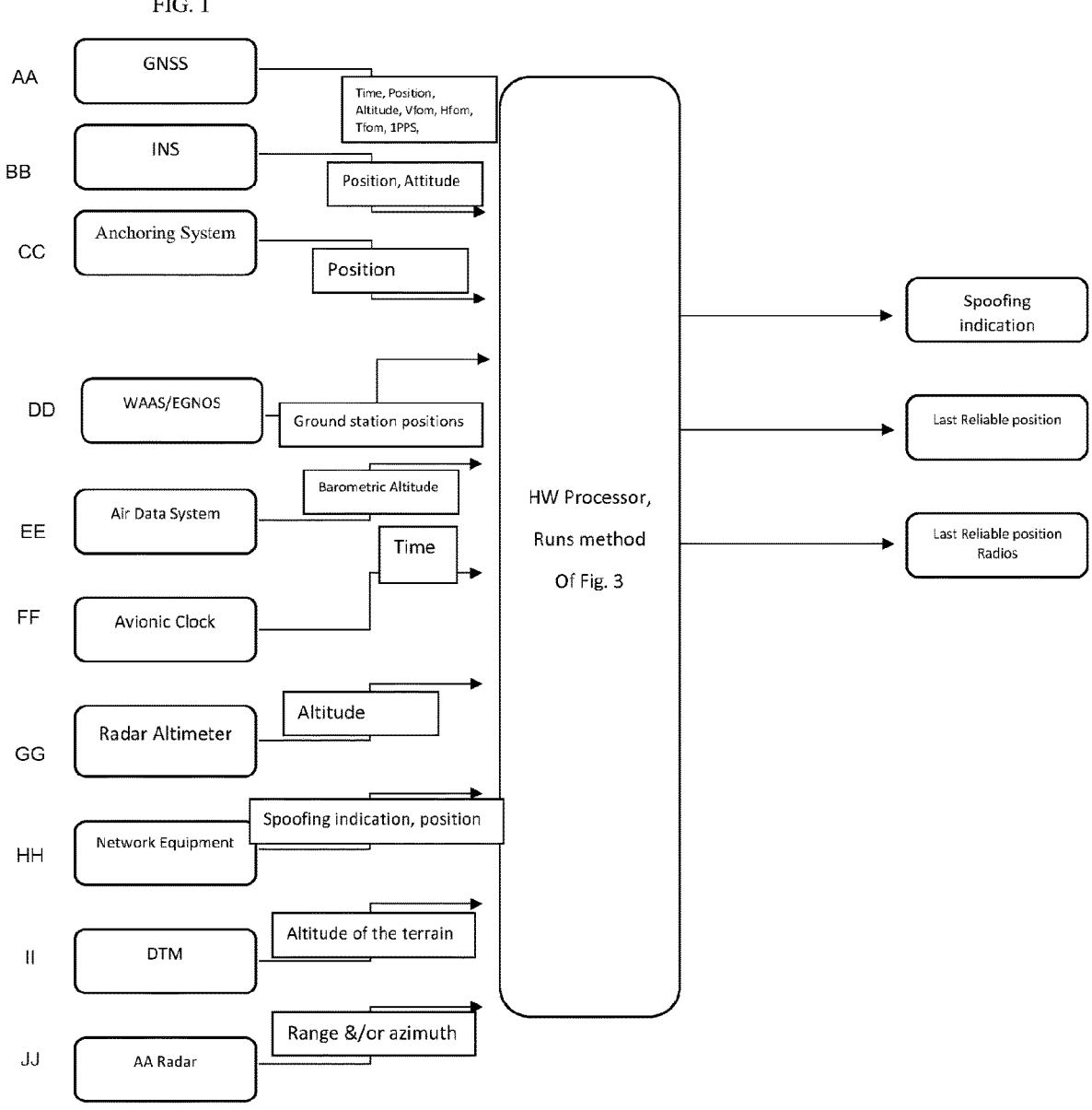

FIG. 1 illustrates a hardware processor configured to perform any method shown and described herein, and other hardware components providing inputs to the hardware processor.

Figure 2:
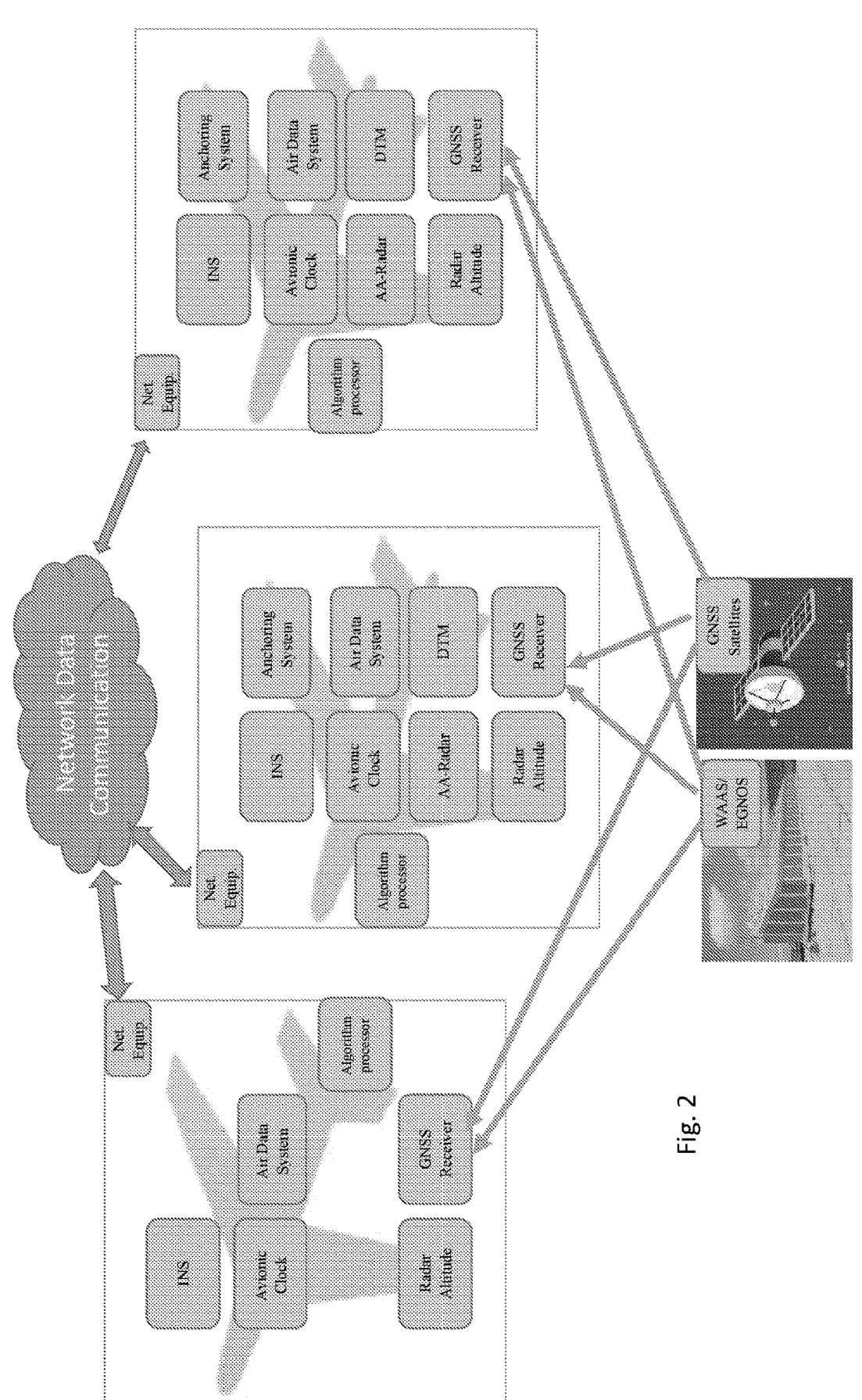

FIG. 2 illustrates a platform and typically plural such, which may be interconnected by suitable network data communication and may have, onboard, a hardware processor such as that of FIG. 1.

FIGS. 3a-3b, taken together, form a simplified flowchart illustration of a method according to certain embodiments including operations as shown, all or any subset of which may be performed, in any suitable order e.g., as shown, for example by the hardware processor of FIG. 1 which may for example be deployed on board any of the platforms of FIG. 2. According to certain embodiments, the 1PPS signal is generated by the GNSS (Global Navigation Satellite System) and in all other operations 1 second (say) is counted according to an internal clock.

Methods and systems included in the scope of the present invention may include any subset or all of the functional blocks shown in the specifically illustrated implementations by way of example, in any suitable order, e.g., as shown. Flows may include all or any subset of the illustrated operations, suitably ordered e.g., as shown. Tables herein may include all or any subset of the fields and/or records and/or cells and/or rows and/or columns described.

Computational, functional, or logical components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences, such as but not limited to objects, procedures, functions, routines and programs, and may originate from several computer files which typically operate synergistically.

Each functionality or method herein may be implemented in software (e.g. for execution on suitable processing hardware, such as a microprocessor or digital signal processor), firmware, hardware (using any conventional hardware technology such as Integrated Circuit Technology), or any combination thereof.

Functionality or operations stipulated as being software-implemented may, alternatively, be wholly or fully implemented by an equivalent hardware or firmware module, and vice-versa. Firmware implementing functionality described herein, if provided, may be held in any suitable memory device and a suitable processing unit (aka processor) may be configured for executing firmware code. Alternatively, certain embodiments described herein may be implemented partly or exclusively in hardware, in which case all or any subset of the variables, parameters, and computations described herein may be in hardware.

Any module or functionality described herein may comprise a suitably configured hardware component or circuitry. Alternatively or in addition, modules or functionality described herein may be performed by a general purpose computer or more generally by a suitable microprocessor, configured in accordance with methods shown and described herein, or any suitable subset, in any suitable order, of the operations included in such methods, or in accordance with methods known in the art.

Any logical functionality described herein may be implemented as a real time application, if and as appropriate, and which may employ any suitable architectural option, such as but not limited to FPGA, ASIC or DS,P or any suitable combination thereof.

Any hardware component mentioned herein may in fact include either one or more hardware devices e.g., chips, which may be co-located or remote from one another.

Any method described herein is intended to include within the scope of the embodiments of the present invention also any software or computer program performing all or any subset of the method's operations, including a mobile application, platform or operating system e.g. as stored in a medium, as well as combining the computer program with a hardware device to perform all or any subset of the operations of the method.

Data can be stored on one or more tangible or intangible computer readable media stored at one or more different locations, different network nodes, or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use, and which is based on any suitable technologies such as semiconductor, magnetic, optical, paper, and others.

DETAILED DESCRIPTION OF CERTAIN EMBODIMENTS

Spoofer detection solutions are now described which may generate, in real time, a time-specific indication that a platform is currently being spoofed (indication with value 1 e.g.), and may then estimate the platform's correct, non-spoofed current position using (only) the platform's own built-in system/s, and may continue using only the platform's own built-in system/s until the time-specific indication that platform is currently being spoofed has turned off (has been superseded with a time-specific indication of value 0 e.g.).

The spoofer detection solutions herein may define measures which can test each navigation method's level of reliability over time e.g. which of various indications of drift are more reliable or less reliable, and may give more or less weight to these, when generating a general, time-specific spoof indication by computing a weighted combination of drift-indication specific alerts.

The spoofer detection solutions described herein may connect plural navigation methods (e.g., plural indications of spoofing which are based on plural respective drift indications) to one generalized navigation method e.g., by combining the outputs of the plural navigations methods, and may define a relationship between the navigation methods for detecting deviations.

A system and process of operation, which may measure or estimate the actual current time, position and altitude of a vehicle (or more generally, platform) and compare them to the platform e.g., vehicle GNSS system time, position and altitude, and identifies GNSS spoofing (and publish the spoofed locations), is now described. FIGS. 1-3, whether provided in combination or separately, are example embodiments.

In FIG. 1, all or any subset of the hardware devices providing inputs to the processor (GNSS, INS, anchoring system, . . . . DTM, radar), may be provided. The processor may perform all or any subset of the operations shown and described herein, and may generate all or any subset of the outputs shown.

As shown, the GNSS typically provides time and/or position and/or altitude of the platform which is running the method of FIGS. 3a-3b.

The INS and anchoring system provide position of the platform which is running the method of FIGS. 3a-3b.

ADS provides barometric altitude of the platform which is running the method of FIGS. 3a-3b.

The radar altimeter provides barometric altitude of the platform which is running the method of FIGS. 3a-3b.

The DTM provides altitude of the terrain over which the platform, which is running the method of FIGS. 3a-3b, and is travelling.

The AA radar provides range from the platform which is running the method of FIGS. 3a-3b, to a network member that is being tracked by the radar.

The anchoring system of FIG. 1 is intended to refer to any subsystem, on board the platform, typically installed on the platform's avionics system, which uses suitable localization techniques, to provide georeferenced localization of the platform without GNSS, using instead:

i. inertial measurements (approximated position+attitude) and/or ii. a (video e.g.) camera facing an arbitrary direction; and/or iii. an orthophoto image map e.g., as described online here: 2103.14381.pdf (arxiv.org)

Typically, the processor of FIG. 1 which may run the method of FIGS. 3a-3b including all or any subset of the operations in FIGS. 3a-3b, is configured to compute GNSS drift indications, comprising indications that certain GNSS-computed quantities, such as but not limited to Time, Altitude and Position (Latitude and/or Longitude), are drifting away from estimates of the same quantities provided by other, non-GNSS based sources. For example, a gap or difference between various GNSS-computed quantities, such as but not limited to Time, Altitude and Position (Latitude and/or Longitude) on the one hand, and estimates of the same quantities provided by other, non-GNSS based sources on the other hand, may be computed and compared to a threshold value.

Descriptions herein of how estimates of GNSS-computed quantities such as Time, Altitude and Position are obtainable from other, non-GNSS based sources, are intended to be merely exemplary, and not limiting.

Referring now to FIGS. 3a-3b, each platform may include all or any subset of the blocks shown and described herein by way of example.

It is appreciated that the network equipment referred to herein, which supports the network data communication between platforms e.g. as shown in FIG. 2, may include all or any component of conventional network hardware e.g. as described online here: en.wikipedia.org/wiki/ Networking_hardware.

Typically, drift-indication specific possible spoof alert computations are all triggered by the same signal which is generated by a single module, e.g., the GNSS.

If the platforms are aircraft, each aircraft may include a suitable avionics system e.g., as described online herein: en.wikipedia.org/wiki/Networking_hardware. This system, or a similar system on non-aircraft platforms, may include a hardware processor (not shown for simplicity) which runs the method of FIGS. 3a-3b and may also include an anchoring system (not shown for simplicity) as described herein.

Inputs to the method herein may include all or any subset of the following inputs; each input below may be provided once, occasionally, periodically, or continuously:

Time Inputs1, . . . 3 (aka inputs T1, . . . . T3):

Input1. GNSS Time from a GNSS which may be aboard the platform

Input2. 1PPS (1 Pulse Per Second) from a GNSS which may be aboard the platform including the platform's Tfom from (or relative to) the GNSS Input3. Avionic Clock Time, from an avionic clock which may be aboard the platform (works in the same resolution as the GNSS and has a well-defined drift). Each tick in the clock represents the clock's resolution.

Position inputs 1, . . . 12 aka inputs P1, . . . p12):

Input1. GNSS Position e.g. Latitude and/or Longitude of platform (e.g., aircraft) which may be spoofed from GNSS Input2. GNSS Altitude of platform (e.g., aircraft) which may be spoofed from GNSS Input3. Hfom e.g., estimated horizontal error of platform (e.g., aircraft) which may be spoofed from GNSS Input4. Vfom e.g., estimated vertical error of platform (e.g., aircraft) which may be spoofed from GNSS Input5. INS Position e.g., Latitude and/or Longitude and/or Altitude of platform from an INS Input6. Network Member Position e.g., Latitude and/or Longitude and/or Altitude of platform received from a network member e.g., platform networked to the platform running all or any subset of operations 10, 20, . . . 140 described herein.

Input7. Anchoring Position e.g., Latitude, Longitude of a platform from a video based anchoring system installed on an avionic system on the platform.

Input8. Barometric Altitude of a platform from Air Data System

Input9. Altitude of the terrain (in refer to the platform's Latitude, Longitude) on which the platform is travelling e.g., flying, from a DTM.

Input10. Radar Altitude of a platform from Radar altimeter

Input11. Radar Range and Azimuth position of a network member from A-A Radar

Input12. 4 Ground stations positions are pre-known ground station positions from a GNSS augmentation system or any other system for improving attributes, e.g., accuracy and/or reliability and/or availability, of any navigation system, such as GNSS or any navigation technology which may be used in GNSS's stead. Such systems for improving navigation attributes include such navigation services as WAAS or EGNOS e.g., as described online here en.wikipedia.org/wiki/ Wide_Area_Augmentation_System and en.wikipedia.org/wiki/European_Geostationary_ Navigation_Overlay_Service or, respectively or more generally, any satellite-based augmentation system (SBAS).

Such systems may provide data to improve positioning accuracy and/or integrity, and/or availability and/or reliability, e.g., by correcting error sources affecting GNSS signals, and may transmit, in real time, corrections to mitigate ranging error sources, such as but not limited to satellite clocks and/or satellite position and/or ionospheric effects.

Such a system may include, in a ground segment, Ranging Integrity Monitoring Stations (RIMS) and/or Mission Control Centres (MCC), and/or Navigation Land Earth Stations (NLES) e.g. for each Geostationary Earth Orbit (GEO), and/or a network e.g. Wide Area Network providing communication between all of the above components. Synchronization of this data with the GPS signal itself, is typically provided.

In a Space Segment, the system may include geostationary satellites broadcasting corrections and/or integrity information for GPS satellites e.g., in the L1 frequency band (1575.42 MHZ). In a user segment, receivers may enable their users to compute their positions with accuracy and integrity, based on data signals received via a compatible receiver.

Such a system's ground-based reference stations may be configured to measure variations in the GPS satellite signals in the western hemisphere. Measurements from reference stations may be routed to master stations, whose queue received Deviation Corrections, and send correction messages to geostationary WAAS satellites typically repeatedly, e.g., at least every 5 seconds. WAAS-enabled (say) GPS receivers may use the corrections while computing their positions to improve accuracy of these computations.

Augmentation typically improves the navigation system's attributes, via integration of external information into navigation computations. Information may characterize sources of error (e.g., clock drift and/or ephemeris and/or ionospheric delay), may indicate how much the signal was off in the past, and/or may include additional platform/vehicle information.

Additional Information:

Input1. Net Member Spoofing Indication Spoofing indication from other networked platforms, e.g., as generated in operation 140.

Typically, each input data (e.g., T1-T3, P1-P12, A1) has a (typically unique, relative to other input data of the same type) time tag which may be generated by a main computer on the platform e.g., if the platform is an aircraft, by the avionics main computer. The time tag may be generated upon generation and/or upon receipt and/or upon transmission of the input data, by the entity (e.g. main computer) responsible for tagging all input data. Typically, if the time tag of one input data is generated upon generation thereof, at least one other input data (typically all) are also generated upon generation thereof. Or, if the time tag of one input data is generated upon receipt thereof, at least one other input data (typically all) are also generated upon receipt thereof. Or, if the time tag of one input data is generated upon transmission thereof, at least one other input data (typically all) is also generated upon transmission thereof.

All the time tags in the platform are synchronized in accordance with the 1 PPS synchronization mechanism as described online here: (en.wikipedia.org/wiki/Pulse-per-second_signal) or in accordance with the avionics main computer clock (en.wikipedia.org/wiki/MIL-STD-1553) that may synchronize all the platform systems. Time synchronization is important in order to compare between inputs from several sources.

All of any subset of the following operations (or of the operations as shown in FIGS. 3a-3b) may be performed, e.g., by a processor on board the platform and/or on the ground. Typically, all operations 10, 20, . . . 140 are performed sequentially and/or repeatedly e.g., continuously or periodically, e.g., once a second.

Operation 10: sampling all or any subset of the GNSS indications values e.g., T1 and/or T2 and/or P1 and/or P3 and/or P4, periodically at a suitable rate such as once a second (1 HZ rate). The values sampled typically include general data and/or platform e.g., aircraft attitude information and/or platform e.g., aircraft position information.

The general data typically includes all or any subset of the following:

10i. Platform e.g. aircraft attitude information which typically includes all or any subset of the following:

Current pitch, roll, yaw values, designated herein as pr y respectively; and/or maximum proper values for proper GNSS reception (which may be based on expert knowledge) for Pitch, Roll, Yaw, designated herein as P R Y respectively.

10ii. The GNSS Position information typically includes or is augmented by all or any subset of the following:

Current Estimated Horizontal Error and Estimated Vertical Error values, designated herein as Hfom Vfom respectively; and/or maximum allowed values (which may be based on expert knowledge) for Horizontal FOM, Vertical FOM, designated herein as HFOM VFOM respectively.

10iii. The GNSS time information typically includes or is augmented by all or any subset of the following:

Current Estimated Time Error, designated herein as Tfom respectively; and/or maximum allowed values (which may be based on expert knowledge) for Time FOM, designated herein as TFOM respectively.

Operation 20: If (g<G) and (p<P and r<R and y<Y) and (Hfom<HFOM and Vfom<VFOM) and (Tfom<TFOM) indicating that the current GNSS input is reliable, then go to operation 30, otherwise discard the current GNSS input of the vehicle and go to operation 10. Alternatively, any other suitable logical combination (not just "and" e.g.) of any suitable criteria of reliability (the criteria which may or may not include conditions on all or any subset of g, p, r, y, Hfom, Vfom, Tfom).

A possible Spoof alert is now computed, e.g. by performing all or any subset of operations 30-90, suitably ordered e.g. as shown. There are 3 main data groups-time, altitude and position. The order of the steps is not crucial in order to find the possible sspoof alert.

Operation 30: Identify a GNSS time drift and compute a possible spoof alert indicating that the platform may be within the range of a spoofer and/or that GNSS readings provided to the platform may be spoofed) e.g., by performing all or any subset of the following operations, suitably ordered, e.g., as follows:

Read the Avionic Clock Time (in ticks) from the avionic computer every time that a 1PPS signal is raised (it is appreciated that "1PPS signal", here and throughout the document, except if otherwise mentioned, is but an example of a periodic reference signal generated by a component of the system herein, typically by one central component, e.g. by the GNSS (as shown in FIG. 1 e.g.), and which may used as a common temporal reference point to trigger operations 30-90 and/or to ensure synchronization between the various data elements described herein):

a. Tprevious_1pps=Tcurrent_1pps b. Tcurrent_1pps=Avionic Clock Time

Read the GNSS Time from the GNSS every time that a 1PPS signal is raised:

a. Tprevious_gnss=Tcurrent_gnss b. Tcurrent_gnss=GNSS Time

Read the Tfom of the GNSS in the clock's resolution value from the GNSS every time that a 1PPS signal is raised and save it to Tfom. Tavionic_clock is the number of ticks which represent 1 second+the clock's drift (pre-known value e.g. constant)

$$T1pps = Tcurrent\_1pps - Tprevious\_1pps$$

$$Tgnss = Tcurrent\_gnss - Tprevious\_gnss$$

For each Tavionic_clock (~1 second):

| | |
|---|---|
| 1. | Read the most updated T1pps value |
| 2. | Read the most updated Tgnss value |
| 3. | Tgap1 = \| Tavionic_clock − T1pps \| |
| 4. | Tgap2 = \| Tavionic_clock − Tgnss \| |
| 5. | If Tgap1 > 0 |
| |     a.    If \| Tgap1 −Tfom \| > 0 |
| |             i.    Possible Spoof alert = 1 |
| |             ii.    go to operation 110 |
| |     b.    Else |
| |             i.    Possible Spoof alert = 0 |
| 6. | If Tgap2 > 0 |
| |     a.    If \| Tgap2 −Tfom \| > 0 |
| |             i.    Possible Spoof alert = 1 |
| |             ii.    go to operation 110 |
| |     b.    Else |
| |             i.    Possible Spoof alert = 0 |

Operation 40: Identify a GNSS barometric altitude drift and compute a Possible Spoof alert indicating that the platform may be within the range of a spoofer and/or that GNSS readings provided to the platform may be spoofed) e.g. by performing all or any subset of the following operations, suitably ordered, e.g. as follows: Read the following every time that a Tavionic_clock (~1 second) has passed:

1. Barometric Altitude (in feet) from the Air Data System

2. GNSS Altitude from the GNSS

3. Estimated altitude error of the GNSS in the clock's resolution value from the GNSS and save it to Hfom BA Reference gap-a pre-known value determined by a human expert/system designer, e.g., as a parameter default value, e.g., /system designer, e.g., as a parameter default value, e.g. in accordance with:

1. The OEM pre-known altitude drift of the GNSS

2. The OEM pre-known drift of the Air Data Computer (according to the Atmosphere conditions)

For each Tavionic_clock (~1 second):

---

1.  Read the most updated Barometric Altitude value
2.  Read the most updated GNSS Altitude value
3.  Bagap = | Barometric Altitude – GNSS Altitude |
4.  If Bagap > BA Reference gap
    a.  If | Bagap –Hfom | > 0
        i.  Possible Spoof alert = 1
        ii. go to operation 110
    b.  Else
        i.  Possible Spoof alert = 0

---

Operation 50: Identify a GNSS computed altitude drift and compute a Possible Spoof alert indicating that the platform may be within the range of a spoofer and/or that GNSS readings provided to the platform may be spoofed) e.g. by performing all or any subset of the following operations, suitably ordered, e.g. as follows:

Read the following every time that a Tavionic_clock (~1 second) has passed:

1. Radar Altitude (in feet) from the Radar Altimeter

2. GNSS Altitude from the GNSS

3. Estimated altitude error of the GNSS in the clock's resolution value from the GNSS and save it to Hfom 4. Altitude of the terrain from a DTM in the current platform position DRA Reference gap-a pre-known value determined by a human expert/system designer, e.g., as a parameter default value, e.g. in accordance with:

---

1.  The OEM pre-known altitude drift of the GNSS
2.  The OEM pre-known drift of the Radar Altimeter
3.  The OEM pre-known drift of the DTM
For each Tavionic_clock (~1 second):
1.  Read the Radar Altitude value
2.  Read the GNSS Altitude value
3.  DRA= Radar Altitude + GNSS Altitude
4.  DRAgap = | DRA – GNSS Altitude |
5.  If DRAgap > DRA Reference gap
    a.  If | DRAgap –Hfom | > 0
        i.  Possible Spoof alert = 1
        ii. go to operation 110
    b.  Else
        i.  Possible Spoof alert = 0

---

Operation 60: Identify a GNSS position drift relative to the INS and compute a Possible Spoof alert Indicating that the platform may be within the range of a spoofer and/or that GNSS readings provided to the platform may be spoofed) e.g. by performing all or any subset of the following operations, suitably ordered, e.g. as follows: Read the following every time that a Tavionic_clock (~1 second) has passed:

1. GNSS Position (e.g. platform latitude and longitude) of the platform from the GNSS 2. INS Position (e.g. platform latitude and longitude) of the platform from the INS 3. Estimated Position error of the GNSS in the clock's resolution value from the GNSS and save it to Vfom INS Reference position gap-a pre-known value determined by a human expert/system designer, e.g., as a parameter default value, e.g. in accordance with:

---

1.  The OEM pre-known position drift of the GNSS
2.  The OEM pre-known position drift of the INS
For each Tavionic_clock (~1 second):
1.  Read the GNSS position values
2.  Read the INS position values
3.  INSgap = | INS position – GNSS position |
4.  If INSgap > INS Reference gap
    a.  If | INSgap –Vfom | > 0
        i.  Possible Spoof alert = 1
        ii. go to operation 110
    b.  Else
        i.  Possible Spoof alert = 0

---

Operation 70: Identify a GNSS position drift relative to an anchoring system (geo-localization system e.g., as described online here: arxiv.org/pdf/2103.14381.pdf) and compute a Possible Spoof alert indicating that the platform may be within the range of a spoofer and/or that GNSS readings provided to the platform may be spoofed) e.g. by performing all or any subset of the following operations, suitably ordered, e.g. as follows:

Read the following every time that a Tavionic_clock (~1 second) has passed:

1. GNSS position (e.g., platform latitude and longitude) of the platform from the GNSS 2. Anchoring Position (e.g., platform latitude and longitude) of the platform from the anchoring system 3. Estimated Position error of the GNSS in the clock's resolution value from the GNSS and save it to Vfom ANC Reference position gap-a pre-known value determined by a human expert/system designer, e.g., as a parameter default value, e.g. in accordance with:

---

1.  The OEM pre-known position drift of the GNSS
2.  The OEM pre-known position drift of the Anchoring system
For each Tavionic_clock (~1 second):
1.  Read the GNSS Position values
2.  Read the Anchoring Position values
3.  ANCgap = | Anchoring Position – GNSS position |
4.  If ANCgap > ANC Reference gap
    a.  If | ANCgap –Vfom | > 0
        i.  Possible Spoof alert = 1
        ii. go to operation 110
    b.  Else
        i.  Possible Spoof alert = 0

---

Operation 80: Identify a GNSS position drift relative to a Network Member Position and compute a Possible Spoof alert indicating that the platform may be within the range of a spoofer and/or that GNSS readings provided to the platform may be spoofed) e.g., by performing all or any subset of the following operations, suitably ordered, e.g., as follows:

Read the following every time that a Tavionic_clock (~1 second) has passed:

1. GNSS Position (e.g., platform latitude and longitude) of the platform from the GNSS 2. Network Member Position (e.g., a net member platform latitude and longitude) of a platform from a network 3. Net Member Spoofing indication of a platform from a network 4. Radar Range of a network member relative to the platform from A-A Radar NetMember Reference position gap-a pre-known value determined by a human expert/system designer, e.g., as a parameter default value, e.g., in accordance with:

1. The OEM pre-known position drift of the GNSS

2. The OEM pre-known range drift of the Radar Range

3. The OEM pre-known position drift of the aerial network

For each Tavionic_clock (~1 second):

```
1.    Read the GNSS Position values
2.    Read the Network Member Position values
3.    Read the Radar Range value
4.    Read the Net Member Spoofing indication of the network member
5.    NetMember Gap = | Network Member Position – GNSS position |
6.    If |NetMember Gap – Radar Range | > 0
          a.   If NetMember Gap > Net Member Reference gap
                  i.   If Net Platform Spoofing indication is 0
                          1.   Possible Spoof alert = 1
                          2.   go to operation 110
                  ii.  Else
                          1.   Possible Spoof alert = 0
          b.   Else
                          1.   Possible Spoof alert = 0
7.    Else
          a.   Possible Spoof alert = 0
```

Operation 90: Identify a GNSS position drift relative to a known ground stations and compute a Possible Spoof alert indicating that the platform may be within the range of a spoofer and/or that GNSS readings provided to the platform may be spoofed) e.g., by performing all or any subset of the following operations, suitably ordered, e.g., as follows: Read the following every time that a Tavionic_clock (~1 second) has passed:

1. GNSS Position (e.g., platform latitude and longitude) of the platform from the GNSS
2. 4 Ground stations positions (e.g., platform latitude and longitude) of a pre-known ground station position
3. Estimated Position error of the GNSS in the clock's resolution value from the GNSS and save it to Vfom Net Reference position gap-a pre-known value determined by a human expert/system designer, e.g., as a parameter default value, e.g. in accordance with:

1. The OEM pre-known position drift of the GNSS
2. The OEM pre-known position drift of the anchoring system
3. The OEM pre-known position drift of the navigation service For each Tavionic_clock (~1 second):

```
1.    Read the GNSS Position values
2.    Read the 4 Ground stations Position values
          a.   Compute the Computed platform position according to
               Ground stations Position (e.g. by using
               http://mason.gmu.edu/~treid5/Math447/GPSEquations/)
3.    Netgap = | Computed platform position – GNSS position |
4.    If Netgap > Net Reference gap
          a.   If | Netgap –Vfom | > 0
                  i.   Possible Spoof alert = 1
                  ii.  go to operation 110
          b.   Else
                  i.   Possible Spoof alert = 0
```

Operation 100: Identify Spoof Position by the following

```
1.    If Possible Spoof alert = 0
          a.   Last Reliable Position = GNSS Position
2.    Else go to operation 110
```

Operation 110: Count the number of consecutive Possible Spoof alert (e.g., the length of a current run of Tavionic_clock, characterized in that all Tavionic_clock signals in the run triggered a Possible Spoof alert of value 1) e.g. in the following way:

```
1.    If Possible Spoof alert = 1
          a.   SpoofIndicationCounter = SpoofIndicationCounter + 1
2.    Else
          a.   SpoofIndicationCounter = 0
          b.   Go to operation 10
```

More generally, in Operation 110, drift-indication specific Possible Spoof alerts may be combined to yield a time-specific spoof indication. This is implicit in the specific embodiment described above by way of example, in which a single possible spoof alert value of 1, obtained using any drift indication, suffices to yield a time-specific spoof indication of 1 (which is why, in the illustrated embodiment, a possible spoof alert of 1 is followed by skipping straight to operation 110. However, more generally, e.g., as described elsewhere herein, other logic (logic which does not involve ORing-all possible spoof alert values) may be used to define the time-specific spoof indication as a combination of drift-indication specific Possible Spoof alerts and this logic may be performed in operation 110.

Operation 120: detect that a spoofer is present, if the run of Tavionic_clock all of which triggered a positive spoof indication, has an over-threshold length e.g., identify Spoof indication by the following:

```
1.    If SpoofIndicationCounter >= 10 (or any other suitable run length)
          a.   Spoof indication = 1
2.    Else
          a.   Go to operation 10
```

Operation 130: Compute Last Reliable Position Radius by the following:

1. Read the platform Velocity from the INS
2. Last Reliable Position Radius=Platform Velocity*SpoofIndicationCounter It is assumed that the platform velocity remains the same as it was in Last Reliable Position Operation 140: Report all or any subset of the following via an aerial network e.g., radio communication such as to other platforms in the area which are in data communication with the platform performing all or any subset of operations 10-140 herein and which may themselves be performing all or any subset of operations 10-140 herein 1. Spoof indication
2. Last Reliable Position
3. Last Reliable Position Radius as computed in operation 130 Go to operation 10

It is appreciated that by sending Last Reliable Position and Last Reliable Position Radius other platforms can define spoofed areas (where Last Reliable Position is the center of a circle and Last Reliable Position Radius is the radius of the circle)

It is appreciated that, by way of example, a spoof indication may be provided at a given time, if even a single navigation method indicates that a spoofer may be present, thus the criterion for presence of a spoofer is defined as navigation method 30 or 40 or . . . 90 (using the numbering of the operations to refer to the respective navigation methods employed). However, alternatively, a spoofer may be deemed present/absent based on any other logical or computational combination of the set of navigation methods corresponding to operations 30, 40, . . . 90, such as deeming a spoofer to be present only if navigation method 30 and 40 and . . . 90 all so indicate. Or deeming a spoofer to be present only if M (e.g. 3 or 4) navigation methods all so indicate, or only if at least one of the first 5 navigation methods all so indicate, and/or deeming a spoofer to be absent if at least one of the first 4 navigation methods all so indicate, etc. any set of rules may be defined, rather than only those rules, and that logic specifically described herein, to combine plural navigation methods, such as all or any subset of navigations methods 30-90 herein. Also, the possible spoof indication need not be binary, and may instead be multi-level (e.g., there may be one or more "inconclusive" levels, or 5 levels such as 1, "tend to 1", inconclusive, "tend to 0" and zero. These states may be combined, again using any suitable logical or computational combination. Or, machine learning may be employed to determine, over time, which navigation methods did best in detecting presence of a spoofer.

According to certain embodiments, training data may be provided by deploying known spoofers at known locations, then operating the system, and then assigning higher and lower weights to navigation methods which detect the known spoofers more and less successfully, respectively.

Training data may include a first set of data points recording gaps or drifts which were found when spoofers are known to have been present, and/or a second set of data points recording gaps or drifts which were found when spoofers are known not to have been present.

Training may encompass plural levels e.g., one level vis a vis a spoofer simulator and the system in general, another level in which the system becomes operational and runs vis a vis real spoofers, and a third level in which recordings made by the platforms are analyzed in the lab to improve functioning of the system.

According to one embodiment, less than all navigation methods are employed in at least one time unit. For example, if a spoofer is deemed to be present in a given time unit, if even one navigation method so indicates, then once a given navigation method so indicates, during a given time-unit, all other navigation methods may be skipped, in that time unit. Similarly, if a spoofer is deemed to be absent in a given time unit, if even one navigation method so indicates, then once a given navigation method so indicates, during a given time-unit, all other navigation methods may be skipped, in that time unit. However, alternatively, all navigation methods may be employed in each time unit. Or, the logic governing which navigation method/s to operate in each time unit may be other than that described above merely by way of non-limiting example.

Also, any suitable criterion of consecutiveness may be employed; the criterion of detecting a spoofer if and only if 10 (or any other threshold number of) spoof indications occur over 10 consecutive time units, is merely an example. The system may, for example, use a criterion of consecutiveness which states that even if time-specific spoof indications occur, say, in 8 consecutive time-units followed by 2 more in which time-specific spoof indications also occur with a 1-unit skip (between the 8 units and the 2 units) in which no time-specific spoof indication occurs, and so forth. The criterion of consecutiveness may be defined over one or more drift-indication specific possible spoof alerts rather than over time-specific spoof indications. If a criterion of consecutiveness is defined over each of plural drift-indication specific possible spoof alerts, then the resulting plural criteria of consecutiveness may be logically combined to yield a single total criterion of consecutiveness.

It is appreciated that many use-cases are possible, including aiding autonomous vehicles to remain in their lane (or commercial aircraft to remain on their desired flight path), and to arrive at the desired destination, and drone navigation including in urban landscapes, and preventing non-authorized entities from wresting control of the drone.

It is appreciated that terminology such as "mandatory", "required", "need" and "must" refer to implementation choices made within the context of a particular implementation or application described herewithin for clarity, and are not intended to be limiting, since, in an alternative implementation, the same elements might be defined as not mandatory and not required, or might even be eliminated altogether.

Components described herein as software may, alternatively, be implemented wholly or partly in hardware and/or firmware, if desired, using conventional techniques, and vice-versa. Each module or component or processor may be centralized in a single physical location or physical device, or distributed over several physical locations or physical devices.

Included in the scope of the present disclosure, inter alia, are electromagnetic signals in accordance with the description herein. These may carry computer-readable instructions for performing any or all of the operations of any of the methods shown and described herein, in any suitable order, including simultaneous performance of suitable groups of operations as appropriate. Included in the scope of the present disclosure, inter alia, are machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order i.e. not necessarily as shown, including performing various operations in parallel or concurrently rather than sequentially as shown; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g., by one or more processors. The invention shown and described herein may include (a) using a computerized method to identify a solution to any of the problems or for any of the objectives described herein, the solution optionally including at least one of a decision, an action, a product, a service or any other information described herein that impacts, in a positive manner, a problem or objectives described herein; and (b) outputting the solution.

The system may, if desired, be implemented as a network—e.g., web-based system employing software, computers, routers and telecommunications equipment, as appropriate.

Any suitable deployment may be employed to provide functionalities e.g., software functionalities shown and described herein. For example, a server may store certain applications, for download to clients, which are executed at the client side, the server side serving only as a storehouse. Any or all functionalities e.g., software functionalities shown and described herein, may be deployed in a cloud environment. Clients e.g., mobile communication devices such as smartphones, may be operatively associated with, but external to the cloud.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Any "if-then" logic described herein is intended to include embodiments in which a processor is programmed to repeatedly determine whether condition x, which is sometimes true and sometimes false, is currently true or false, and to perform y each time x is determined to be true, thereby to yield a processor which performs y at least once, typically on an "if and only if" basis, e.g., triggered only by determinations that x is true, and never by determinations that x is false.

Any determination of a state or condition described herein, and/or other data generated herein, may be harnessed for any suitable technical effect. For example, the determination may be transmitted or fed to any suitable hardware, firmware or software module, which is known or which is described herein to have capabilities to perform a technical operation responsive to the state or condition. The technical operation may, for example, comprise changing the state or condition or may more generally cause any outcome which is technically advantageous given the state or condition or data, and/or may prevent at least one outcome which is disadvantageous given the state or condition or data. Alternatively or in addition, an alert may be provided to an appropriate human operator or to an appropriate external system.

Features of the present invention, including operations which are described in the context of separate embodiments, may also be provided in combination in a single embodiment. For example, a system embodiment is intended to include a corresponding process embodiment, and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art, and particularly, although not limited to, those described in the Background section, or in publications mentioned therein.

Conversely, features of the invention, including operations, which are described for brevity in the context of a single embodiment or in a certain order, may be provided separately or in any suitable sub-combination, including with features known in the art (particularly although not limited to those described in the Background section or in publications mentioned therein) or in a different order. "e.g." is used herein in the sense of a specific example which is not intended to be limiting. Each method may comprise all or any subset of the operations illustrated or described, suitably ordered e.g., as illustrated or described herein.

Devices, apparatus or systems shown coupled in any of the drawings may in fact be integrated into a single platform in certain embodiments, or may be coupled via any appropriate wired or wireless coupling, such as but not limited to optical fiber, Ethernet, Wireless LAN, HomePNA, power line communication, cell phone, Smart Phone (e.g. iPhone), Tablet, Laptop, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

Any suitable communication may be employed between separate units herein, e.g., wired data communication and/or in short-range radio communication with sensors such as cameras, e.g., via Wifi, Bluetooth® wireless communication technology, or Zigbee® wireless mesh networking protocol.

It is appreciated that implementation via a cellular app as described herein is but an example, and, instead, embodiments of the present invention may be implemented, say, as a smartphone SDK, as a hardware component, as an STK application, or as suitable combinations of any of the above.

Any processing functionality illustrated (or described herein) may be executed by any device having a processor, such as but not limited to a mobile telephone, set-top-box, TV, remote desktop computer, game console, tablet, mobile e.g. laptop or other computer terminal, embedded remote unit, which may either be networked itself (may itself be a node in a conventional communication network e.g.) or may be conventionally tethered to a networked device (to a device which is a node in a conventional communication network, or is tethered directly or indirectly/ultimately to such a node).

Any operation or characteristic described herein may be performed by another actor outside the scope of the patent application, and the description is intended to include an apparatus, whether hardware, firmware or software, which is configured to perform, enable, or facilitate that operation, or to enable, facilitate, or provide that characteristic.

The terms processor or controller or module or logic as used herein are intended to include hardware such as computer microprocessors or hardware processors, which typically have digital memory and processing capacity, such as those available from, say Intel and Advanced Micro Devices (AMD®) graphics processing units (GPUs). Any operation or functionality or computation or logic described herein may be implemented entirely, or in any part, on any suitable circuitry, including any such computer microprocessor/s as well as in firmware or in hardware, or any combination thereof.

It is appreciated that elements illustrated in more than one drawing, and/or elements in the written description, may still be combined into a single embodiment, except if otherwise specifically clarified herewithin. Any of the systems shown and described herein may be used to implement, or may be combined with, any of the operations or methods shown and described herein.

It is appreciated that any features, properties, logic, modules, blocks, operations or functionalities described herein which are, for clarity, described in the context of separate embodiments, may also be provided in combination in a single embodiment, except where the specification or general knowledge specifically indicates that certain teachings are mutually contradictory, and cannot be combined. Any of the systems shown and described herein may be used to implement, or may be combined with, any of the operations or methods shown and described herein.

Conversely, any modules, blocks, operations or functionalities described herein, which are, for brevity, described in the context of a single embodiment, may also be provided separately or in any suitable sub-combination, including with features known in the art. Each element e.g., operation described herein, may have all characteristics and attributes described or illustrated herein, or, according to other embodiments, may have any subset of the characteristics or attributes described herein.

The invention claimed is:

1. A method for identifying spoofers affecting a platform, the method comprising:
   providing a time-specific spoof indication including
       using plural GNSS drift indications to compute plural drift-indication specific possible spoof alerts respectively, and
   combining said drift-indication specific possible spoof alerts to yield the time-specific spoof indication
       wherein plural navigation methods are connected to one generalized navigation method,
       and a relationship is defined between the navigation methods for detecting deviations.

2. The method according to claim 1 wherein the plural drift indications comprise outputs of plural navigation methods.

3. A computer program product, comprising a non-transitory tangible computer readable medium having computer readable program code embodied therein, said computer readable program code adapted to be executed to implement a method for identifying spoofers affecting a platform, the method including providing a time-specific spoof indication by
   using plural GNSS drift indications to compute plural drift-indication specific possible spoof alerts respectively, and
   combining said drift-indication specific possible spoof alerts to yield the time-specific spoof indication
       wherein plural navigation methods are connected to one generalized navigation method,
   and a relationship is defined between the navigation methods for detecting deviations.

4. The computer program product according to claim 3 wherein the plural drift indications comprise outputs of plural navigation methods.

5. A system for identifying spoofers affecting a platform comprising:
   a hardware processor configured for, at least once, providing a time-specific spoof indication including
       using plural GNSS drift indications to compute plural drift-indication specific possible spoof alerts respectively, and
       combining said drift-indication specific possible spoof alerts to yield the time-specific spoof indication,
       wherein machine learning is employed to determine over time which navigation method did best in detecting presence of a spoofer.

6. The system according to claim 5 and also comprising alerting for presence of a spoofer affecting the platform, if at least one sequence of time-specific spoof indications (or of drift-indication specific possible spoof alerts) occurs which answers to a criterion of consecutiveness.

7. The system according to claim 5 wherein the computing of a time-specific spoof indication occurs repeatedly.

8. The system according to claim 5 wherein each drift-indication specific possible spoof alert is computed each time a periodically occurring signal.

9. The system according to claim 5 wherein said plural GNSS drift indications include a GNSS time drift.

10. The system according to claim 5 wherein said plural GNSS drift indications include a GNSS barometric altitude drift.

11. The system according to claim 5 and wherein said time-specific spoof indication is used to navigate the platform.

12. The system according to claim 5 and also comprising a platform having navigation apparatus and wherein said time-specific spoof indication is used by said navigation apparatus to navigate the platform.

13. The system according to claim 5 wherein an input is considered reliable if the input is known to be unaffected by the spoofer and where at least one unreliable input is filtered out.

14. The system according to claim 5 wherein said time-specific spoof indication triggers an alert, sent to network members, of presence of a spoofer affecting the platform.

15. The system according to claim 5 wherein each GNSS drift indication used to compute each drift-indication specific possible spoof alert, is time-tagged, to ensure synchronization of all drift indications used.

16. The system according to claim 5 wherein each GNSS drift indication used to compute each drift-indication specific possible spoof alert, is time-tagged, to ensure synchronization of all drift-indication specific possible spoof alerts computed.

17. The system according to claim 5 wherein the plural drift indications comprise outputs of plural navigation methods.

18. The system according to claim 5 and wherein said time-specific spoof indication includes at least one of reporting time-specific spoof indication via an aerial network to other platforms, and reporting said time-specific spoof indication to an operator of a platform operating the system.

19. The system according to claim 18 wherein said reporting includes providing a last position of the platform known to be unaffected by the spoofer, to one or more of the group consisting of:
   other platforms and
   the operator of the platform operating the system.

20. The system according to claim 5 wherein said plural GNSS drift indications include a GNSS computed altitude drift.

21. The system according to claim 5 wherein said plural GNSS drift indications include a GNSS position drift.

22. The system according to claim 21 wherein the GNSS position drift is determined relative to an inertial navigation subsystem aka INS (which may be GNSS aided).

23. The system according to claim 21 wherein the GNSS position drift is determined relative to an anchoring system.

24. The system according to claim 21 wherein the GNSS position drift is determined relative to a network member position.

25. The system according to claim 21 wherein the GNSS position drift is determined relative to at least one ground station whose position is known.

26. The system according to claim 21 wherein said GNSS position drift comprises GNSS Latitude drift.

27. The system according to claim 21 wherein said GNSS position drift comprises GNSS Longitude drift.

28. The system according to claim 21 wherein the GNSS position drift is determined relative to a network member spoofing indication.

29. The system according to claim 5 wherein said time-specific spoof indication triggers an alert, to a platform operator, of presence of a spoofer affecting the platform.

30. The system according to claim 29 wherein the alert comprises a report of the last position of the platform which is known to be unaffected by the spoofer.

31. The system according to claim 29 wherein the alert comprises a report of the platform's last position radius known to be unaffected by the spoofer.

\* \* \* \* \*

26